United States Patent
Bohm et al.

(10) Patent No.: US 6,860,548 B2
(45) Date of Patent: Mar. 1, 2005

(54) VEHICLE ROOF MODULE

(75) Inventors: Horst Bohm, Frankfurt (DE); Rainer Grimm, Frankfurt (DE); Thomas Becher, Rodgau (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/624,461

(22) Filed: Jul. 22, 2003

(65) Prior Publication Data

US 2004/0094992 A1 May 20, 2004

(30) Foreign Application Priority Data

Jul. 23, 2002 (DE) .......................................... 102 33 280

(51) Int. Cl.$^7$ .............................................. B62D 25/00
(52) U.S. Cl. ...................................................... 296/210
(58) Field of Search ................................ 296/210, 214, 296/29

(56) References Cited

U.S. PATENT DOCUMENTS

| 6,367,872 | B1 | * | 4/2002 | Bohm et al. ................ 296/214 |
| 2001/0003400 | A1 | * | 6/2001 | Grimm et al. .............. 296/210 |
| 2002/0042996 | A1 | | 4/2002 | Pauly et al. |
| 2002/0093225 | A1 | * | 7/2002 | Grimm ........................ 296/210 |
| 2003/0020302 | A1 | * | 1/2003 | Lumpe et al. .............. 296/210 |

FOREIGN PATENT DOCUMENTS

| DE | 2929915 | * | 7/1979 |
| DE | 29 29 689 A1 | | 2/1981 |
| DE | 3420781 A1 | | 1/1985 |
| DE | 197 09 016 A1 | | 9/1998 |
| EP | 1 088 749 A2 | | 4/2001 |
| WO | WO 03/045762 A1 | | 6/2003 |

OTHER PUBLICATIONS

European Search Report filed May 10, 2004.

* cited by examiner

Primary Examiner—Joseph D. Pape
(74) Attorney, Agent, or Firm—Carlson, Gaskey & Olds

(57) ABSTRACT

A vehicle roof module is interlocked releasably yet securely directly with the body frame (3), which encompasses an upper body opening, or indirectly with a frame covering (13) which is fastened to the frame. The interlocking elements (8) are only accessible from the vehicle interior in order to release the interlock and also only after previously elastically bending over a portion of the inner shell (1) of the roof module, which covers the locking elements (8). The roof module can be easily assembled, dissassembled and also replaced and thus has properties of a hardtop.

9 Claims, 4 Drawing Sheets

VEHICLE ROOF MODULE

REFERENCE TO RELATED APPLICATION

This application claims reference to German Patent Application No. 102 33 280.0 issued Jul. 23, 2002.

BACKGROUND OF THE INVENTION

The invention relates to a vehicle roof module, in particular a motor vehicle roof module.

Vehicle roofs of the kind (DE 197 09 016 A1) which are prefabricated in modular fashion so as to be ready to fit are finished separately from the vehicle body and only jointed to the latter on the assembly line in the automobile factor. Vehicle roof modules of this kind are becoming increasingly important, in particular on account of the significant reduction of the assembly time on the assembly line.

In the case of a known roof arrangement for a motor vehicle with a circulating roof frame fixed to the body and a rigid roof part which is releasably connected to this roof frame by using quick-acting closures (DE 29 29 915 A1), the roof part is only provided at its end region facing the windscreen or the rear window of the vehicle with hooks pointing in the direction of the respective other end region. These hooks engage behind a mating profile at the roof frame. The quick-acting closures, which are in the form of eccentric closures, only act on the respective other end region of the roof part. A circulating seal is clamped between the roof part and the roof frame.

Although in this known roof arrangement the roof part can be released and removed from the body by unlocking the quick-acting closures, the roof part is not fastened to the roof frame in its two side regions, so that it is problematic to seal the roof part with respect to the roof frame in these regions. The quick-acting closures are not or cannot be concealed towards the vehicle interior in this roof construction and are therefore inconveniently visible at the inside roof lining. There is also the undeniable possibility of the engagement of the hooks with the mating profile at the roof frame being accessible from outside even when the vehicle is locked, so that the roof part could easily be removed by unwanted outside intervention.

SUMMARY OF THE INVENTION

The object of the invention, with regard to a vehicle roof module constructed as initially indicated, is to configure the latte such it can be assembled quickly without quick-acting closures or the like and only removed from the vehicle interior, without releasable fastening means being visible from the vehicle interior.

The vehicle roof module constructed according to the invention can be assembled, disassembled and replaced just through simple interlocking and unlocking operations, without this requiring special tools and without the locking elements being visible. As the locking elements act internally on the body frame, the vehicle roof module can only be unlocked from the vehicle interior. The vehicle roof module according to the invention can be practically handled like a removable and optionally replaceable hardtop.

The embodiment of one example has projections of the lower layer of the inner shell which additionally secure the locking engagement of the locking elements with the inner edge of the body frame or a frame covering firmly connected thereto.

The projections may in this case also be interlockable so as to be releasable via an interlocking hook attached thereto with a mating hook of the locking elements.

The projections described above may expediently already be molded onto the lower layer of the inner shell when the latter is foamed.

The actual locking elements may advantageously be angular, with a fastening limb which is foamed onto or into the upper layer of the inner shell and an interlocking limb which projects downward, is resiliently compliant and in the form of a hairpin spring in the interlocking region. The locking elements in one example are permanently shaped in an expedient manner from spring steel strip material.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
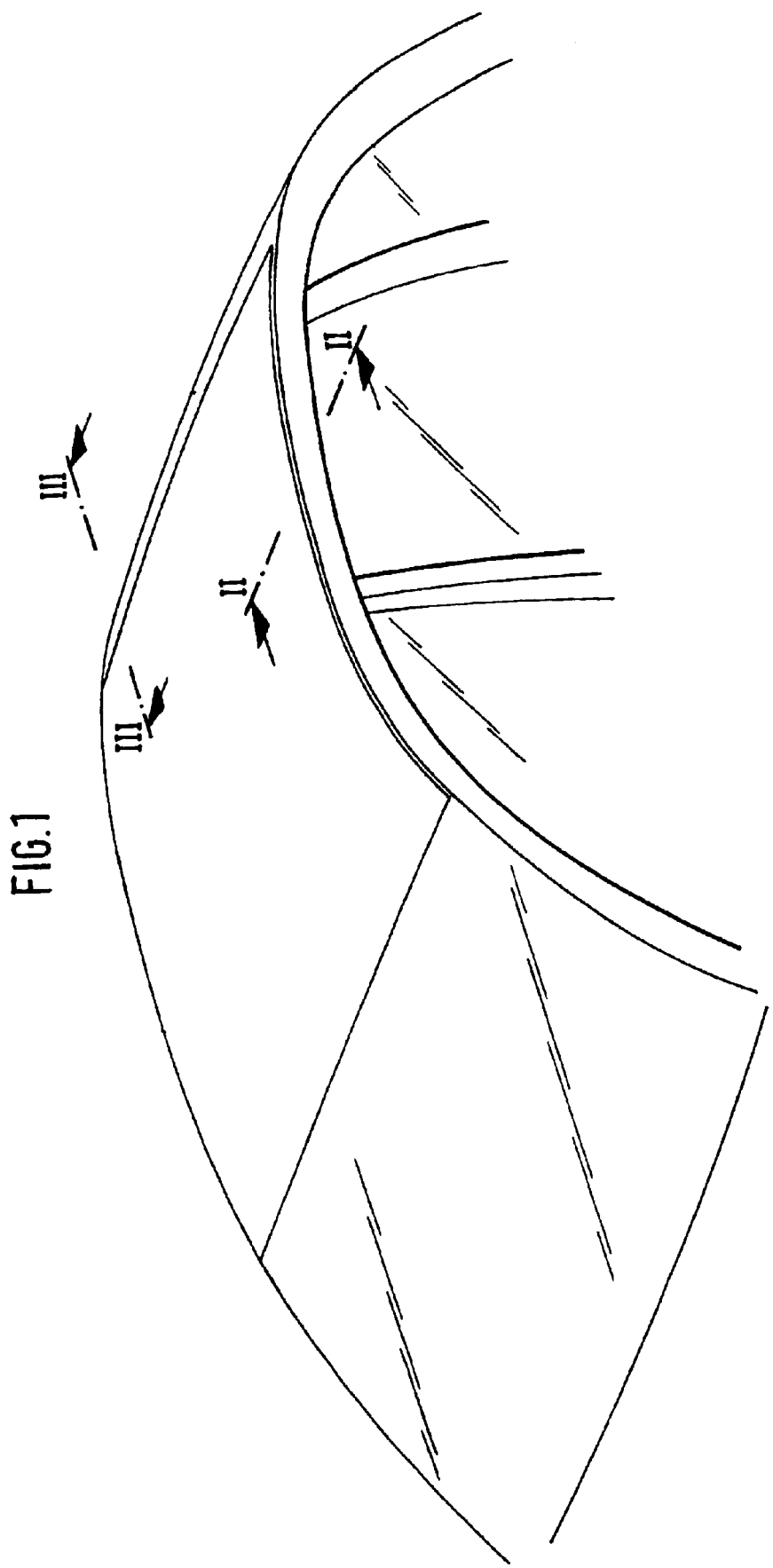
FIG. 1 is a perspective representation of the roof and window region of a passenger car.
Figure 2:
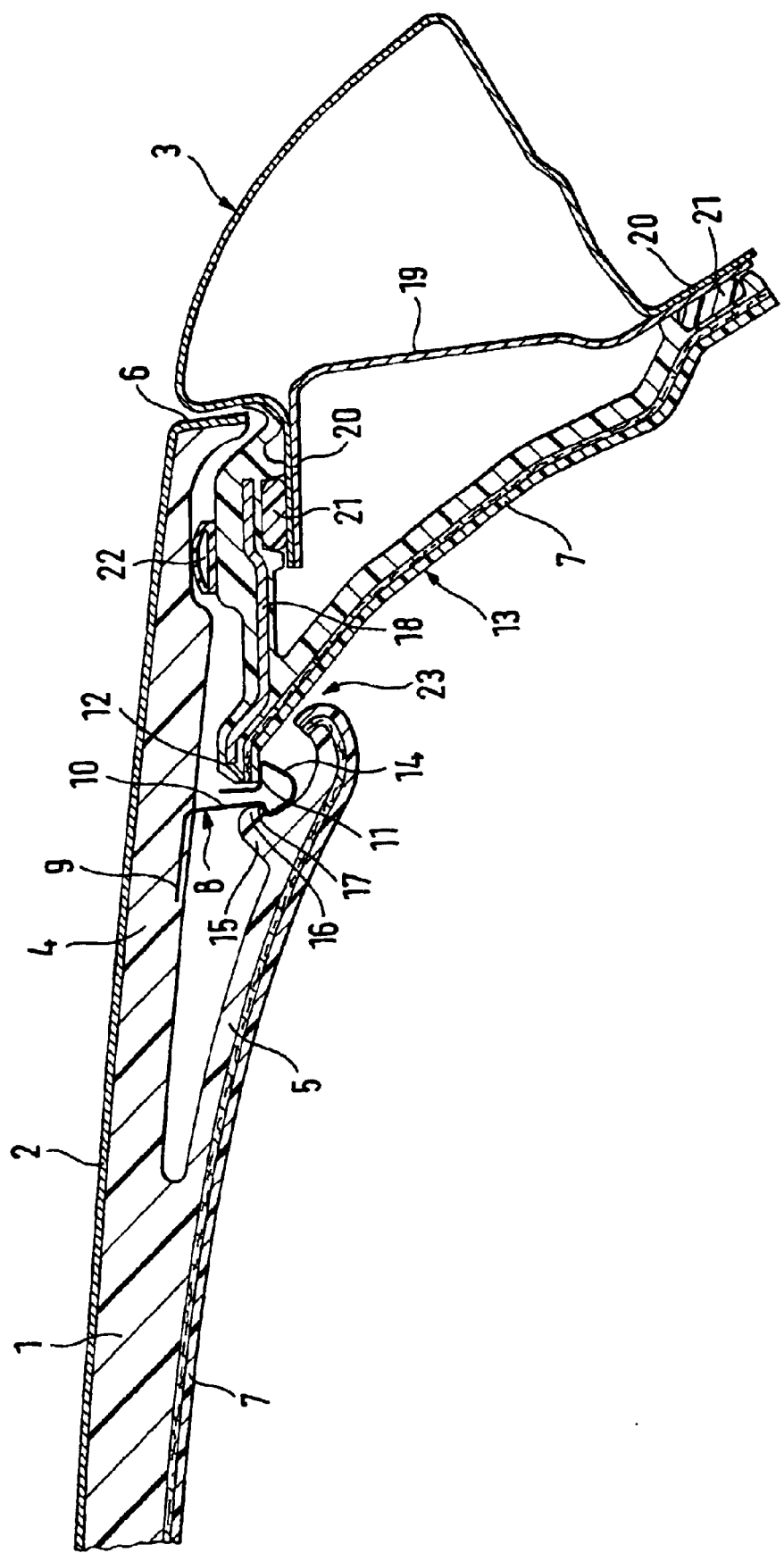
FIG. 2 is a section along the intersection line II—II in FIG. 1 to illustrate a first embodiment.
Figure 3:
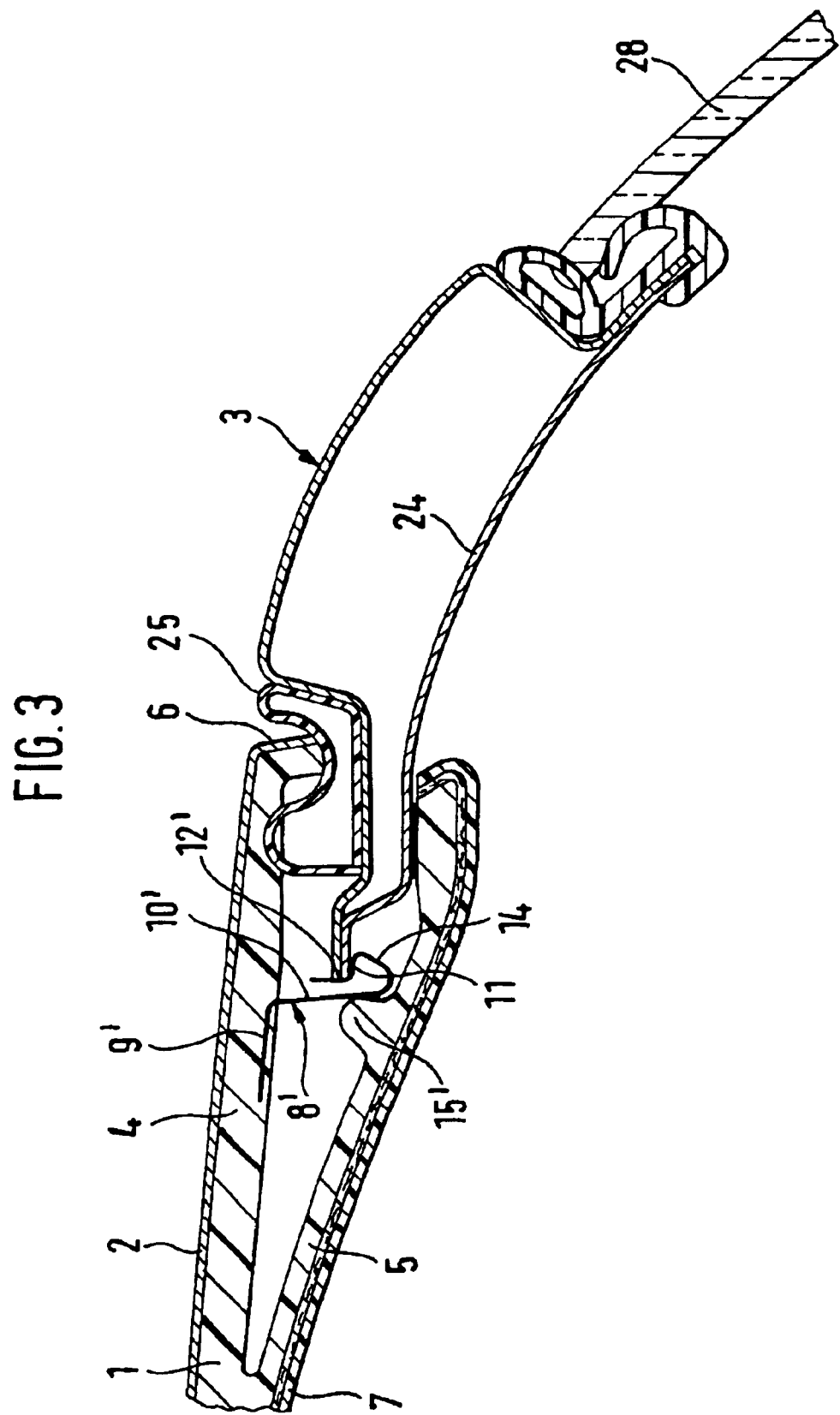
FIG. 3 is a section along the intersection line III—III in FIG. 1 according to a second embodiment.
Figure 4:
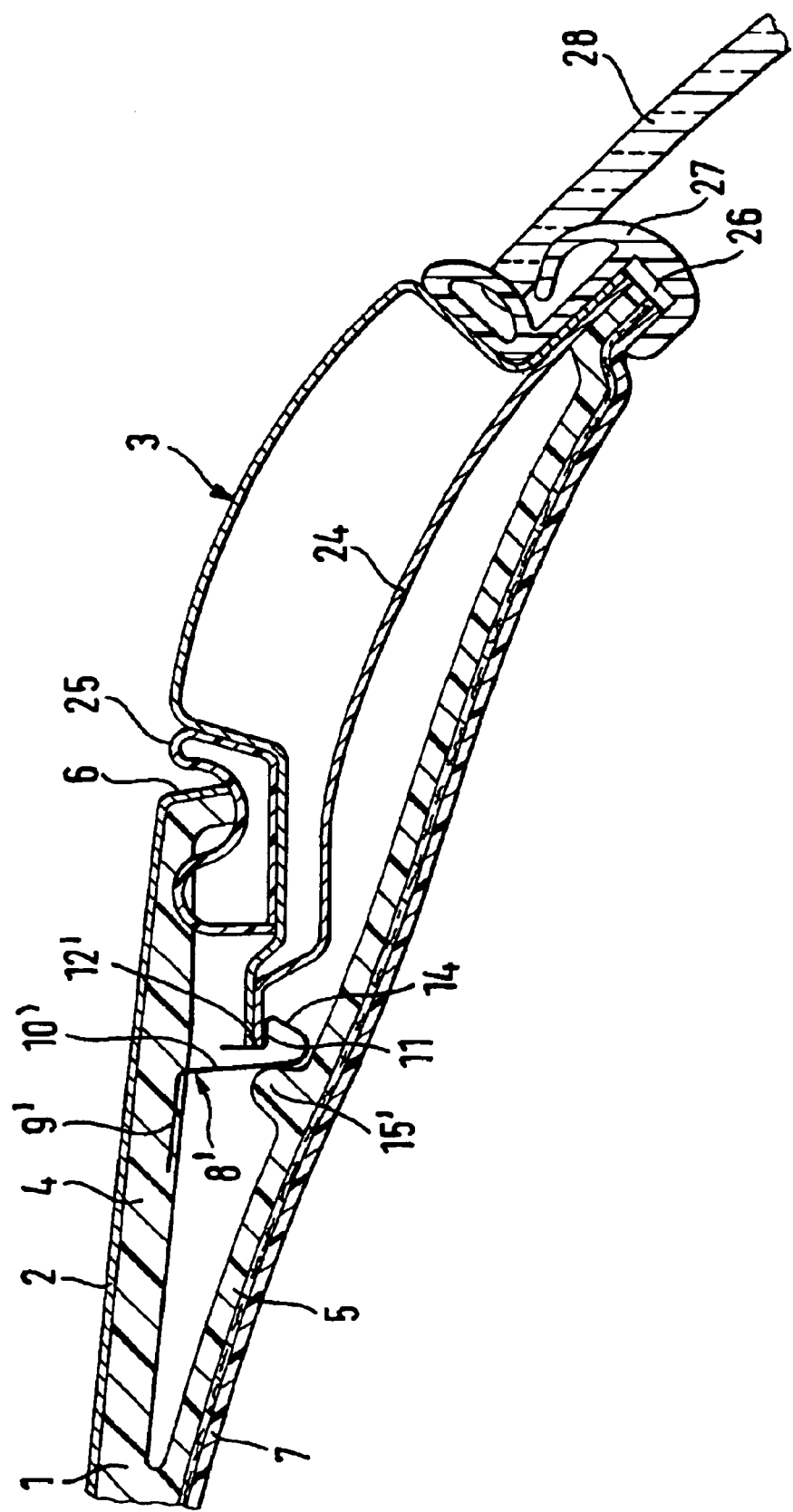
FIG. 4 is likewise a section along the intersection line III—III in FIG. 1 which, however, illustrates a third embodiment.

FIG. 2 is a section through a side region of the vehicle roof module, while FIGS. 3 and 4 in each case represent sections through the rear region of the vehicle roof module. However, the three different embodiments are each constructed according to the illustrated section of all four sides of the vehicle roof module.

In all illustrated embodiments the inner shell 1 of the roof module is made of a foamed plastics material which is foamed onto a rigid roof membrane 2. The rigid roof membrane 2 consists of a deep-drawn metal sheet, for example aluminum sheet, or may be made of a vacuum-formed plastics sheet. However, the invention may also be applied to roof module embodiments which do not comprise a firm roof membrane. In this case the roof membrane essentially consists of a rigid foamed plastics material which is shaped like a shell and so as to be inherently rigid and has a smooth outer face which is or can be varnished.

In all embodiments the inner shell 1 is divided in the region of the outer edges intended for lying on the body frame 3 into two layers, the upper layer 4 of which is placed directly on the body frame 3 in a way yet to be described for the individual embodiments, while the lower layer 5 projects beyond the body opening which is defined by the body frame 3 and can be bent over downwards without undergoing permanent deformation in order to pass through this opening.

Suitable materials for the inner shell 1 are PUR-based rigid foamed plastics materials which may be reinforced by fibrous materials, for example glass-fibre lengths, incorporated in the plastics material prior to the foaming-on process. However, woven fabrics, knitted fabrics and non-wovens, etc., placed in the foaming mold, are also suitable reinforcements. The process of foaming on the reinforced inner shell 1, the upper layer 4 of which reaches up to an edge bevel 6 of the roof membrane 2, produces a sandwich-like composite roof module of high dimensional stability and strength. All inner contours of the inner shell 1, including the lower layer 5, are created by giving the foaming mold (not represented) an appropriate shape.

The inner face of the inner shell 1 may be coated with a textile of film-like lining material 7 in order to create an inside roof lining. Reinforcement parts (not represented in the foam of profiles may be embedded in the foamed plastics material in the upper layer 4. The three differently constructed embodiments shall now be described in the following on the basis of FIGS. 2 to 4.

As can be seen from FIGS. 2 to 4, springy, resilient locking elements 8 or 8' are fastened to the upper layer 4, a plurality of which locking elements may be attached to each of the four sides of the roof module. In the illustrated embodiments the locking elements 8, 8' are of angular construction, with a fastening limb 9 or 9', which is associated with the upper layer 4, and an interlocking limb 10 or 10', which is constructed like a hairpin spring. The locking elements 8, 8' in some examples are shaped from spring steel strip material.

In all illustrated embodiments the interlocking limb 10, 10' is provided at its side facing the body frame 3 with an inward bent locking step 11, which is in releasable interlocking engagement with the inner edge 12 of a frame covering 13 in the embodiment according to FIG. 2 and with the inner edge 12' of the actual body frame 3 in the embodiments according to FIGS. 3 and 4. In order to facilitate the action of interlocking with the inner edge 12, 12', the interlocking limb 10, 10' has an oblique face 14 which slides on the inner edge 12, 12' when interlocking takes place, with simultaneous elastic bending by forming of the interlocking limb 10, 10', until the locking step 11 is interlocked below the inner edge 12, 12', with elastic return of the interlocking limb 10, 10'. The interlocked position of the parts is represented in FIGS. 2 to 4.

In all three embodiments the lower layer 5 completely covers the locking elements 8, 8', so that these are neither directly accessible nor capable of posing a threat of injury to the vehicle's passengers. The locking elements 8, 8' can only be actuated after bending over the lower layer 5. This takes place by elastically bending the interlocking limbs 10, 10'0 until the locking step 11 is no longer engaged with the inner edge 12, 12', whereupon the roof module can then be moved upwards.

Projections 15 or 15', which face the upper layer 4, are provided on the lower layer 5 (FIGS. 3 and 4). These projections are shown integrally molded onto the lower layer 5 and consist of foamed plastics material in the illustrated examples. These projections lie against the locking element 8', 8', interlocked at the inner edge 12, 12', and thus additionally secure the interlocked position of the locking elements.

In the embodiment according to FIG. 2 an interlocking hook 16 is additionally molded onto the projection 15. The hook 16 is releasably interlocked with a corresponding mating hook 17 on the locking element 8.

The frame covering 13 which is provided in the embodiment according to FIG. 2 is shaped from a rigid foamed plastics material, has an upper foamed-in reinforcement insert 18 and is fastened to flanges 20 of the cross member 19 of the body frame 3, for example by adhesive beads 21. The roof module lies with the upper layer 4 sealed off on an elastic hollow-chamber seal 22 which is fastened to the frame covering 13.

The frame covering 13 is also coated with lining material 7 towards the vehicle interior. The lower layer 5 is bent over at its end and terminates at a spacing from the frame covering 13, thereby creating between the frame covering 13 and the lower end of the lower layer 5 an engagement gap 23 which enables the lower layer 5 to bend while terminating the interlock between the interlocking hooks 16 and the mating hooks 17, so as to make the locking elements 8 accessible for unlocking the roof module.

In the embodiments which are represented in FIGS. 3 and 4 the roof module lies with its edge bevel 6 and the portion of the upper layer 4 which is located at the latter on the cross member 24 of the body frame 3. An elastic hollow-chamber seal 25 is fastened to the cross member 24 and interposed between the frame and the edge 6. In the embodiment according to FIG. 3 the lower layer 5 does not cover the cross member 24. Instead it is releasably stuck to the cross member 24 or connected thereto by Velcro fasteners at one end. In the embodiment according to FIG. 4 the lower layer 5 completely covers the cross member 24 and is releasably inserted at one end in a groove 26 of a sealing profile, which also seals off the rear window 28.

A vehicle roof module is disclosed which is interlocked releasably yet securely directly with the body frame, which encompasses an upper body opening, or with a frame covering which is fastened thereto. The interlocking elements are only accessible from the vehicle interior in order to release the interlock and also only after previously elastically bending over a portion, which covers the locking elements, of the inner shell of the roof module. The roof module can be easily assembled, disassembled and replaced and also thus has properties of a hardtop.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle roof module that is made separately from a vehicle body, comprising:

a foamed plastic shell having an outer edge that includes a first layer that is adapted to be placed in a sealed fashion on a vehicle body frame and a second layer spaced from the first layer; and a plurality of resilient locking elements at least partially supported by the first layer and having a locking portion positioned between the first and second layers, the locking portion being adapted to releasably secure the roof module to the vehicle body frame.

2. The roof module of claim 1, wherein the second layer completely covers the locking elements.

3. The roof module of claim 1, wherein the second layer includes a plurality of projections corresponding to the plurality of locking elements, the projections being positioned to cooperate with the locking elements to maintain the locking elements in an interlocking engagement with the vehicle body frame.

4. The roof module of claim 3, wherein the second layer is pliable such that the projections are selectively moved out of a position contacting the locking elements.

5. The roof module of claim 3, wherein the projections have an interlocking hook that is releasably interlocked with a corresponding hook on the locking elements.

6. The roof module of claim 3, wherein the projections are integrally molded as part of the second layer.

7. The roof module of claim 1, wherein the locking elements include a fastening limb that is supported in the first layer and an interlocking limb that depends from the fastening limb.

8. The roof module of claim 7, wherein the interlocking limb has the form of a hairpin spring.

9. The roof module of claim 1, wherein the locking elements comprise spring steel strip material.

* * * * *